United States Patent
Kim

[19]

[11] Patent Number: 5,983,111
[45] Date of Patent: Nov. 9, 1999

[54] ADAPTIVE CONSTANT FALSE ALARM RATE SYSTEM FOR DETECTING CDPD BURSTS

[75] Inventor: In-Kyung Kim, North Potomac, Md.

[73] Assignee: Hughes Electronics Corporation, El Sugundo, Calif.

[21] Appl. No.: 08/889,198

[22] Filed: Jul. 8, 1997

[51] Int. Cl.$^6$ .................................................. H04B 17/00
[52] U.S. Cl. ...................... 455/466; 455/67.1; 455/67.3; 455/511
[58] Field of Search ................... 455/466, 67.1, 455/67.3, 62, 423, 63, 511

[56] References Cited

U.S. PATENT DOCUMENTS

| | | | |
|---|---|---|---|
| 5,574,750 | 11/1996 | Peponides et al. | 455/67.1 |
| 5,625,889 | 4/1997 | Chikkaswamy et al. | 455/67.1 |
| 5,719,902 | 2/1998 | Quick et al. | 455/67.1 |
| 5,805,982 | 9/1998 | Hulsebosch | 455/466 |
| 5,854,808 | 12/1998 | Peponides et al. | 455/434 |

*Primary Examiner*—David R. Hudspeth
*Assistant Examiner*—Daniel Abebe
*Attorney, Agent, or Firm*—John T. Whelan; Michael W. Sales

[57] ABSTRACT

An adaptive constant false alarm rate system provides a method and apparatus for reliably detecting burst information by minimizing the effects of noise levels and signal quality on the detection decision. In particular, the adaptive constant false alarm rate system of the present invention acquires an accurate estimate of the noise floor during a time when no signals information is present on the channel. Accordingly, any activity on the channel during this idle time is a relatively accurate indication of the channel's noise activity. This noise floor estimate is incorporated into a constant false alarm detection scheme to thereby minimize the effects of both the noise level and signal quality on the detection scheme.

34 Claims, 3 Drawing Sheets

ADAPTIVE CONSTANT FALSE ALARM RATE SYSTEM FOR DETECTING CDPD BURSTS

BACKGROUND OF THE INVENTION

Wireless cellular telephony systems have enjoyed increased popularity in recent years. At various times, the channels that carry voice communications in a cellular telephony system may be idle (i.e., no signal transmission over the channel at a particular time). These unused or idle voice channels may be utilized for other communications such as data communication. In particular, an overlay communication system utilizing unused or idle voice channels for digital data communication is desirable. Cellular Digital Packet Data (CDPD) is such an overlay system which provides mobile datagram service utilizing the idle voice channels of an existing cellular telephony infrastructure. Like standard cellular voice transmissions, the CDPD overlay system transmits data from a plurality of remote subscriber units to base stations which relay the data to external fixed end systems or other CDPD networks. Data communication from the remote subscriber units to the base stations is wireless, and the subscriber units may be movable or stationary.

A consortium of cellular communication carriers prepared and released in 1993 a specification entitled "Cellular Digital Packet Data System Specification." The specification defines a protocol to be used by the industry when transmitting and receiving CDPD data messages over an existing cellular communication system. The protocol specifies that CDPD shall be transmitted at a symbol rate that is an integer multiple of 19.2 KHz. The protocol also specifies that CDPD messages are transmitted in bursts, with each burst having a preamble formed by a dotting sequence of 38 bits followed by a synchronization pattern of 22 bits. Following the preamble is the data sequence comprised of n multiples of 385 bits of data.

In general, demodulation of the received CDPD signals involves first acquiring the signal/burst, then demodulating the so-called steady state portion of the burst. Microslot markers separated by approximately 3.125 microseconds mark the beginning of the burst arrival window. The acquisition process involves detecting the presence of a burst signal, then estimating certain parameters such as burst arrival time and carrier frequency offset. Detection is typically accomplished by comparing some processed portion of the received signal with a detection threshold. If the threshold is improperly set, data bursts will be missed completely (a condition known as "burst miss"), and/or the detector will believe that it has detected a burst when in fact no burst is present (a condition known as "false-alarm").

Two fundamental design parameters in the burst detection process are the burst miss probability (or rate) $P_M$ and the false-alarm probability (or rate) $P_{FA}$. Generally, $P_M$ is a function of the signal energy to noise power density ratio (SNR) and $P_{FA}$ is a function of the noise floor level of a particular communication channel. In a cellular environment, the noise floor is dependant on factors such as amplifier gain, antenna gain, cable losses in front of the CDPD demodulator, and others. Because the noise floor is generally different from site to site, providing a fixed threshold generally results in poor performance.

One way to regulate $P_{FA}$ is a system known generally as "constant false-alarm rate" (CFAR). In general, a CFAR system attempts to achieve a constant false alarm rate independent of noise level in the receiver. One approach to achieving CFAR is a standard ratio detection scheme in which a correlation value of the preamble portion of the burst is divided by a measure of the signal energy on the preamble portion of the burst. A detection is declared if the calculated ratio exceeds the threshold. An example of how ratio detection may be used in a CFAR system is disclosed in an article entitled "The Effect Of The Frequency Offset On The Probability of Miss In A Packet Modem Using CFAR Detection Method", written by M. R. Solemani and H. R. Girard (IEEE Tran. Communication Theory, Vol. 40, No. 7, July 1992, at pages 1205–1211). The $P_{FA}$ using ratio detection CFAR can be expressed solely as a function of the threshold setting, and is not dependent on the noise level. However, the $P_M$ using ratio detection CFAR is very sensitive to the signal quality. For mobile CDPD transmitters, signal quality can vary widely depending upon factors such as the particular hardware configuration or the proximity of the mobile unit to the base station.

Thus, there is a need for a CFAR detection scheme having a reduced sensitivity to both noise levels and signal quality, while maximizing burst detection probability (i.e., minimizing $P_M$).

SUMMARY OF THE INVENTION

The present invention provides an adaptive CFAR system for detecting CDPD bursts with reduced sensitivity to both noise levels and signal quality. The invention includes estimating the noise floor in the channel independent of the signal by measuring the channel's power level during an idle period when no signal is being transmitted, then setting the detection threshold proportional to the power level that was measured during the aforementioned idle period. This strategy may be represented by the following equation:

$$\left| \sum_{k=0}^{K_1-1} r(n_0+k) \frac{s^*(k)|^2}{(n_0 > K_2)} \stackrel{?}{>} n \sum_{k=0}^{K_2-1} |n(k)|^2. \tag{1}$$

wherein $K_1$ and $K_2$ are numbers of sample points to be used, $n_o$ is the fixed delay relative to the beginning of the microslot, "*" represents the complex conjugate operation, and n is the detection threshold. The left side of the equation is a correlation of the received signal with the known dotting sequence. In particular, s(k) is a complex envelope signal representing the known dotting sequence pattern and $r(n_o+k)$ represents the received dotting sequence of the burst. Notably, in equation (1), {n(k), k =0, 1, ..., $K_2$–1, represents the noise samples, which are independent of the signal portion of the equation {$r(n_o+k)$}, k=0, 1, . . . , $K_1$–1.

The left hand side of the equation and the right hand side of the equation process non-overlapping ($n_o>K_2$) portions of the received signal for each detection process. The symbol n(k) is used in equation (1) to emphasize the fact that the invention guarantees the signal-free (or noise only) received samples for computation in the right hand side of equation (1). Therefore, it can be considered as the noise power (or energy) estimation process in the receiver for a particular detection process (microslot).

An important feature of the present invention is to provide the signal-free samples for the right hand side computation in equation (1). This is accomplished by exploiting the following CDPD protocols.

1. The forward (MDBS to M-ES) over-the-air transmitted signal carries micro-slot timing marker occurring at each 3.125 milisecond (60 bits).
 2. Five (5) bit fields in the beginning of each micro-slot are used for micro-slot synchronization and busy/idle flag.

3. An M-ES transmission should be synchronized with the micro-slot, i.e., the M-ES's transmission should occur within 8-bit time interval from a particular micro-slot timing determined by the M-ES.
4. An M-ES is allowed to transmit its own reverse burst only if the micro-slot is idle (i.e., busy/idle flag is set to idle by MDBS).
5. There is a guard time at the end of each reverse burst transmission (2 mili-seconds of ramp down).

Because the M-ES needs to decode the busy/idle flag before its transmission, the micro-slot timing for the M-ES is the end of the 5-bit synchronization and busy/idle flag bit fields. Therefore during this 5 bit time interval, no reverse transmission occurs. In other words, the MDBS sees signal-free received signal samples during this 5-bit time interval when it is in detection mode, i.e., the particular micro-slot is idle. The MDBS can take advantage of this situation by properly defining its own micro-slot timing to synchronize the processes (most of the MDBS's processes should be implemented synchronously with its micro-slot timing). Instead of defining micro-slot timing consistent with M-ES (at the end of 5 sync bits), the invention defines the micro-slot timing for the MDBS at the beginning of the 5 sync bits. In this way, whenever the MDBS starts its detection process, the first 5-bits worth of received signal samples are guaranteed to be signal-free (noise only).

Also, to enhance the performance, the invention exploits the delay associated with GMSK-modulation. Since the GMSK-modulation used for CDPD systems require memory (partial response signaling), it has inherent modulation delays (at least 2 bits), i.e., a modulated signal (or over-the-air signal) corresponding to a particular bit at the input to the GMSK-modulator appears at least 2 bits later (two bit delay between the GMSK-modulator input and output). Therefore, by defining the reference point of the micro-slot timing for the MDBS as the input to the GMSK-modulator, the time interval for making noise power estimation is increased by 2 bits, which gives better performance. Because the referencing scheme allows one to take advantage of the MDBS's receiver hardware delay, the noise power measurement interval can be expanded further by this amount. With this referencing scheme, exactly the same delays can be utilized with respect to the M-ESs. This additional expansion is made possible because of the guard time at the end of each reverse transmission (item 5 above). For the present invention, 3 bits on the MDBS's delay are utilized and a 1 bit delay is assumed for the M-ES's.

Therefore, an idle period totalling about 9 bits can be fully utilized for the noise floor estimation by careful generation of the micro-slot markers, and utilizing first-in-first-out (FIFO) input procedures for the MDBS input buffer. Thus, the following strategy may be implemented.

1. Generate the micro-slot marker for the MDBS DSP's just before the first bit of the busy/idle flag is sent to the GMSK-modulator for GMSK modulation and transmission. This micro-slot marker constitutes the micro-slot timing for the MDBS DSP's to detect and demodulate a burst. Note for the M-ES, the micro-slot timing is usually at the end of the bust/idle flag (plus decoding and air delay).
2. For each idle micro-slot, reset the MDBS DSP's FIFO (or input buffer) at the reception of the micro-slot marker. The first sample in the FIFO (or input buffer) after resetting is the beginning of the particular micro-slot.
3. During the first 9 bit interval (i.e., "idle interval"), estimate the noise floor according the equation (1).
4. Get the correlation value between the received signal and the dotting sequence with some delay as in equation (1). The delay should be selected to cover the bits of uncertainty time interval and to utilize the most reliable portion of the dotting sequence.
5. make a detection decision according to equation (1).

Accordingly, the method of the present invention includes a method of detecting signals transmitted from a first station to a second station via a communication channel. The steps include determining an "idle interval" (which is different from the "idle slot") during which no signals are transmitted from the first station to the second station via the communication channel; measuring activity on said communication channel during said idle interval; and utilizing the measured activity on said communication channel during said idle interval, along with a threshold value, to determine whether activity on said communication channel outside of said idle interval comprises one of said signals.

In another aspect of the invention, the above-referenced method includes, inter alia, determining whether activity on said communication channel outside of said idle interval is one of said signals by correlating the received signal with a known signal pattern; measuring activity on said communication channel during said idle interval by measuring energy on said communication channel; utilizing the measured activity on said communication channel during said idle interval, along with a threshold value, to determine whether activity on said communication channel outside of said idle interval is one of said signals by multiplying said threshold value by said energy measured on said communication channel.

The method of the present invention may further include a method of setting a threshold for detecting a signal on a communication channel. The steps of the method include, inter alia, determining an idle interval during which no signals are being transmitted on said communication channel; measuring activity on said communication channel during said idle interval; and utilizing the measured activity on said communication channel during said idle interval, along with an initial threshold value, to determine a scaled threshold value.

In another aspect of the invention, the above-referenced method includes, inter alia, utilizing said scaled threshold value to determine whether activity on said communication channel outside of said idle interval is one of said signals; utilizing said scaled threshold value to determine whether activity on said communication channel outside of said idle interval is one of said signals by correlating a received signal with a known signal pattern; measuring activity on said communication channel during said idle interval by measuring energy on said communication channel; utilizing the measured activity on said communication channel during said idle interval, along with said initial threshold value, to determine a scaled threshold value by multiplying said initial threshold value by said energy measured on said communication channel.

The apparatus of the present invention includes a receiver that detects signals transmitted from a remote station via a communication channel. The receiver includes an input unit capable of receiving and detecting activity on the communication channel, and a processing circuit in communication with said input unit and programmed to: determine an idle interval during which no signals are transmitted from the remote station to the receiver via the communication channel; measure activity on said communication channel during said idle interval; and utilize the measured activity on said communication channel during said idle interval, along with a threshold value, to determine whether activity on said communication channel outside of said idle interval comprises one of said signals.

In another aspect of the invention, the above-referenced processing circuit is further programmed to: determine whether activity on said communication channel outside of said idle interval is one of said signals by correlating the received signal with a known signal pattern; measure activity on said communication channel during said idle interval by measuring energy on said communication channel; utilize the measured activity on said communication channel during said idle interval, along with a threshold value, to determine whether activity on said communication channel outside of said idle interval is one of said signals by multiplying said threshold value by said energy measured on said communication channel. The remote station may be a mobile communication unit, the receiver may be a base station of a cellular communication system, and the signals may be cellular digital packet data.

The apparatus of the present invention further includes a receiver that detects signals received via a communication channel. The receiver includes an input unit capable of receiving signals from said communication channel, and a processing circuit in communication with said input unit and programmed to: determine an idle interval during which no signals are being transmitted on said communication channel; measure activity on said communication channel during said idle interval; and utilize the measured activity on said communication channel during said idle interval, along with an initial threshold value, to determine a scaled threshold value.

In another aspect of the present invention, the above-referenced processing circuit is further programmed to: utilize said scaled threshold value to determine whether activity on said communication channel outside of said idle interval comprises one of said signals; utilize said scaled threshold value to determine whether activity on said communication channel outside of said idle interval is one of said signals by correlating a received signal with a known signal pattern; measure activity on said communication channel during said idle interval by measuring energy on said communication channel; utilize the measured activity on said communication channel during said idle interval, along with said initial threshold value, to determine a scaled threshold value by multiplying said initial threshold value by said energy measured on said communication channel.

The invention itself, together with further objects and attendant advantages, will best be understood by reference to the following detailed description, taken in conjunction with the accompanying drawings.

DETAILED DESCRIPTION OF THE DRAWINGS

The present invention provides a method and apparatus for reliably detecting burst information by minimizing the effects of noise levels and signal quality on the detection decision. In particular, an adaptive constant false alarm rate system is disclosed in which an accurate estimate of the noise floor is acquired during a time when it is known that no signal information is present on the channel. Accordingly, any activity on the channel during this "idle time" is a relatively accurate indication of the channel's noise activity. This noise floor estimate is incorporated into a CFAR detection scheme to thereby minimize the effects of both the noise level and signal quality on the detection scheme.

Figure 1:
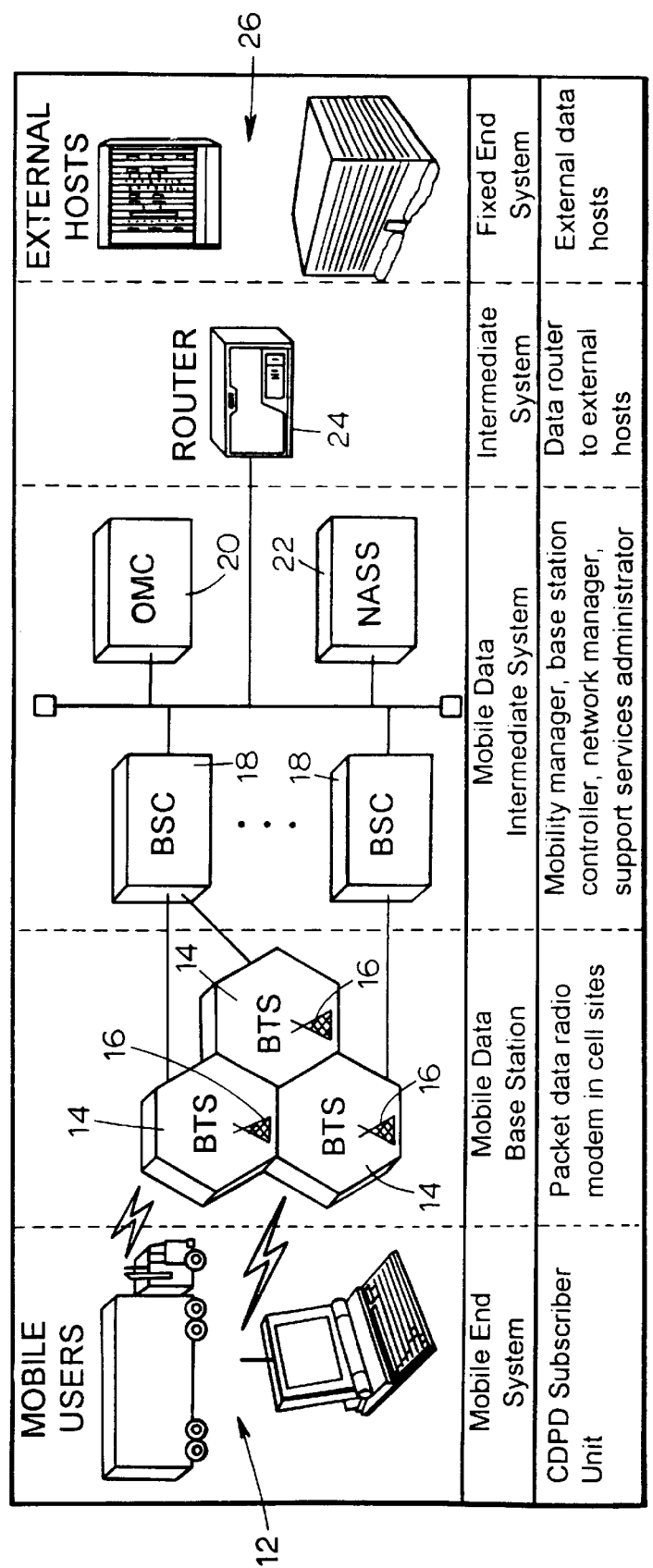
FIG. 1 is a general block diagram of a cellular-radio, CDPD communication system.

The present invention may be utilized in an otherwise conventional wireless cellular telephony system having cellular digital packet data (CDPD) transmission capabilities. FIG. 1 illustrates at 10 a general block diagram of such a system. The following is a simplified description of the system 10, intended for illustrative purposes only, and focussing primarily on the CDPD aspects of the system 10. In general, the voice/data cellular radiotelephone communication system 10 includes a plurality of remote, mobile CDPD subscriber units 12 and conventional voice-based, mobile radiotelephone units (not shown). Geographical areas are divided into cells 14, and within each cell 14 is a base station (BTS) 16 that transmits and receives signals from the subscriber units 12. The base stations 16 are wire-connected to base station controllers (BSC) 18, mobility managers (OMC) 20, and network manager support services administrator (NASS) 22. The BSC 18, OMC 20 and NASS 22 are wire-connected to a router 24 and external hosts 26. The remote subscriber units 12, which may be mobile or stationary, communicate with the external hosts 26, or with other remote subscriber units 12, through the base stations 16.

As illustrated in FIG. 1, the complete CDPD architecture consists of five logical elements—a Mobile End System (M-ES), a Mobile Data Base Station (MDBS), a Mobile Data Intermediate System (MD-IS), an Intermediate System (IS), and a Fixed End System (F-ES). In general, the M-ES includes the mobile CDPD subscriber units 12 and conventional mobile radiotelephone units (not shown), which operate as wireless communication devices. Their physical locations may change with time, but continuous network access is maintained. The MDBS includes a plurality of voice and/or data base stations (BTS) 16 which act as a packet data radio modem at cell cite locations serving as a relay between the M-ES and its serving MD-IS. The MD-IS includes the BSC 18, OMC 20, and NASS 20. The MD-IS performs routing functions to support mobility by the M-ES, based on knowledge of location of the M-ES. The IS is a standard data router 24 that supports connection-less network service, and interfaces the voice/data system 10 to external fixed end systems or other CDPD networks. The F-ES includes external data application systems, or host computers 26 whose location is fixed. The F-ES is interfaced to an IS by traditional existing network routing.

Figure 2:
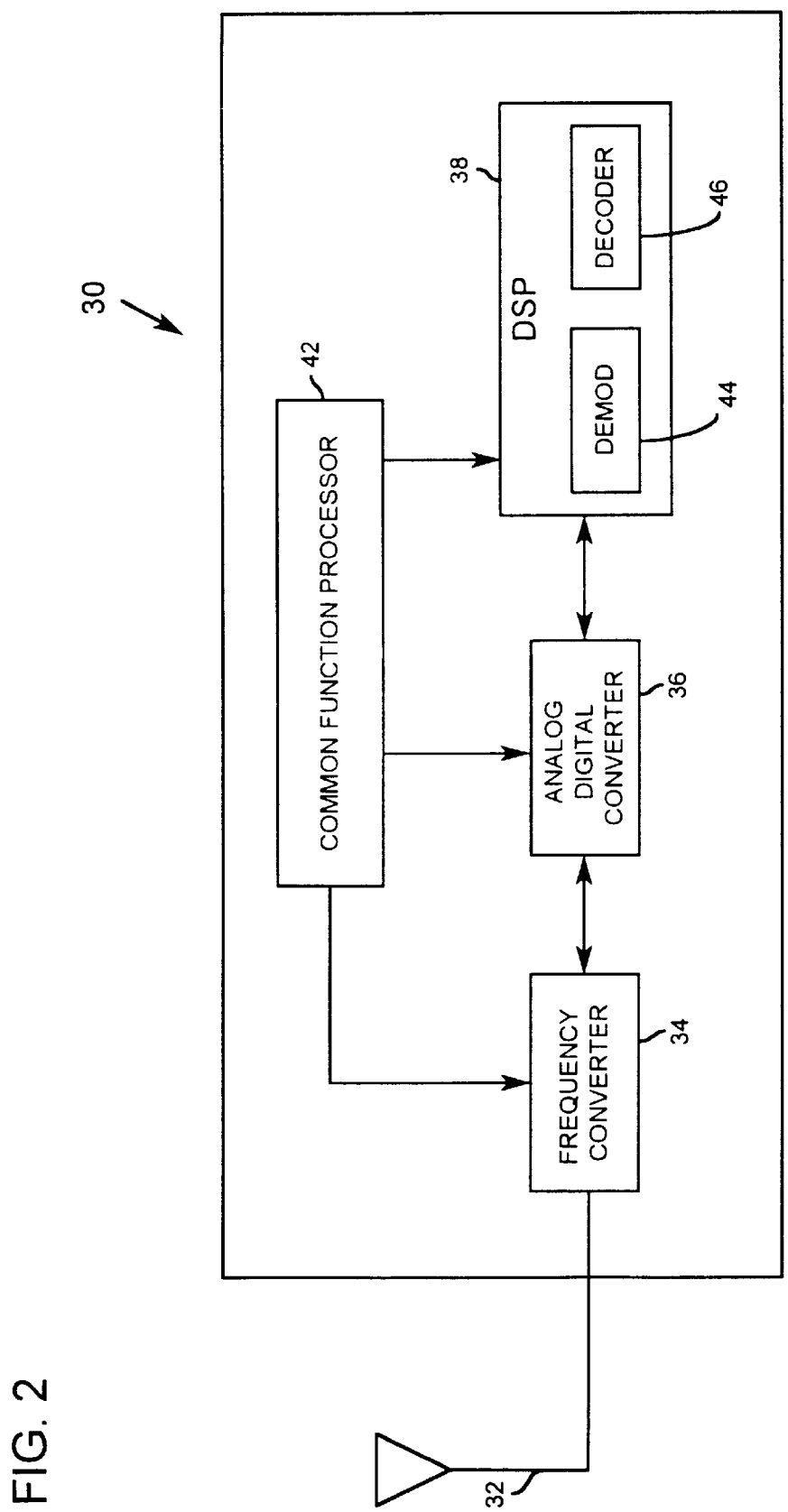
FIG. 2 is a block diagram of a transceiver embodying features of the present invention. The transceiver is part of the base station shown in FIG. 1.

FIG. 2 is a block diagram of a portion of a transceiver 30 embodying features of the present invention. The transceiver 30 is part of the base stations 16 shown in FIG. 1. Preferably, the transceiver 30 has sufficient hardware components to process frequency modulated analog voice, TDMA modulated digital voice, and GMSK modulated CDPD data. The transceiver 30 includes at least one antenna 32, a frequency converter 34, an analog/digital converter 36, a digital signal processors (DSP) 38, and a common function processor 42. The DSP 38 includes a demodulator 44 and a decoder 46. The antenna 32 receives signals transmitted by a remote subscriber unit 12, and transmits signals from the transceiver 30 to remote subscriber units 12. For received signals, the frequency converter 34 strips away the carrier frequency, and the analog/digital converter 36 converts the resulting signal to digital. For signals that are to be transmitted, the analog/digital converter 36 and the frequency converter 34 perform the opposite operations, converting the digital bit stream to analog, then converting the analog signal to the required RF frequency for transmission.

Figure 3:
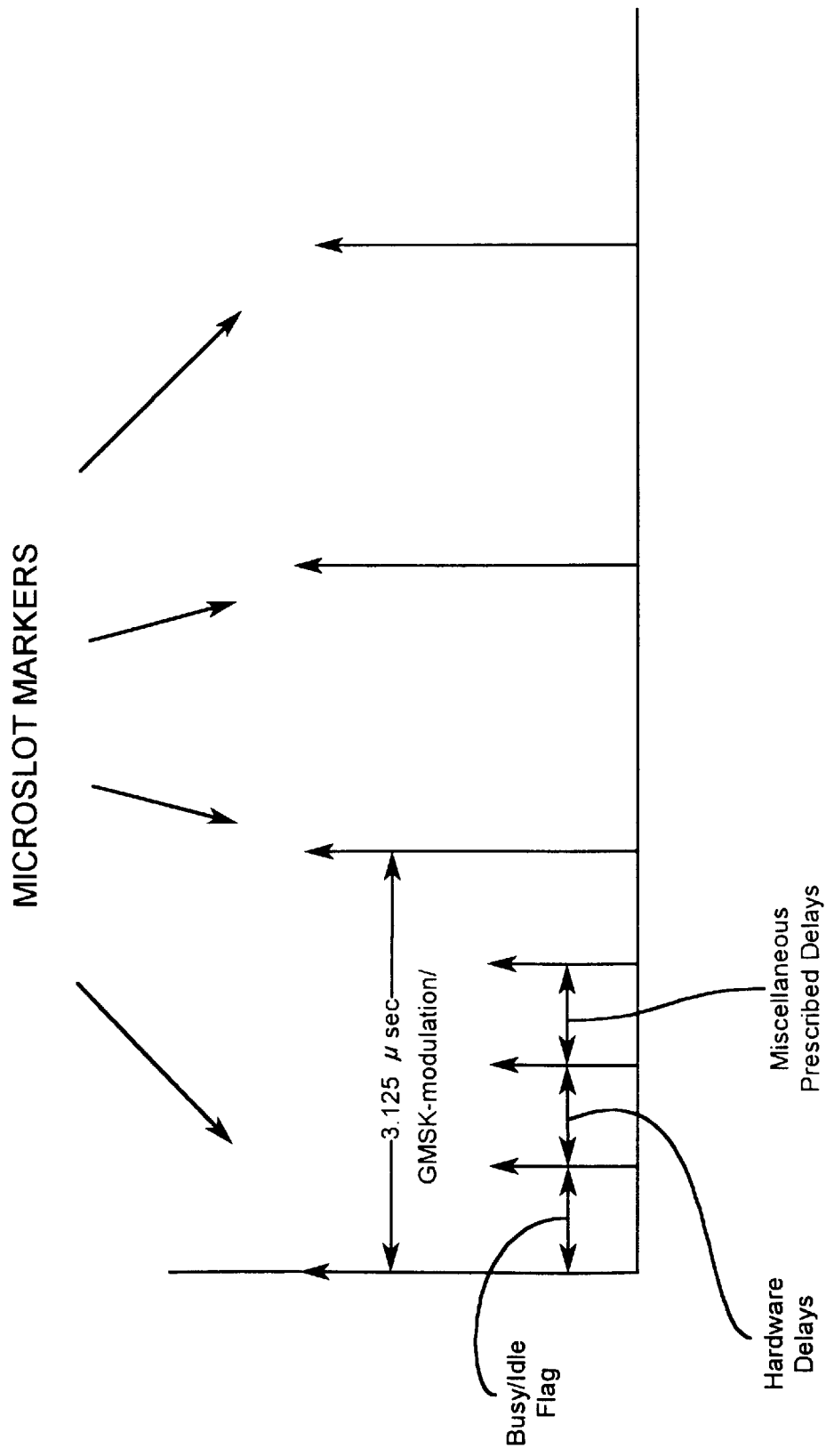
FIG. 3 is diagram illustrating an example of the micro-slot spacing and reception delays when the present invention is utilized in a CDPD system of the type shown in FIGS. 1 and 2.

In the CDPD system of FIGS. 1 and 2, signals are transmitted from the MDBS to the M-ES via forward communication channels, and from the M-ES to the MDBS via reverse communication channels. In order to coordinate these transmissions between the MDBS and the M-ES, a messaging protocol is established according the CDPD specifications. This protocol calls for M-ES reverse channel communication to take place during specified time periods. In particular, microslot marker signals are transmitted periodically from the MDBS to the M-ES, and reverse channel transmission can only be started during a specified period in the beginning of the microslot markers. FIG. 3 is diagram illustrating an example of the microslot spacing and reception delays when the present invention is utilized in a CDPD system of the type shown in FIGS. 1 and 2. Typically, the microslots are 3.125 microseconds apart.

Initially, the MDBS transmits to the M-ES a forward synchronizing bit pattern that provides synchronizing information including the timing pattern of the microslots. The CDPD protocol requires the M-ES to devote at least 5 bits at the start of each microslot to determining the channel status (busy or idle). The microslot markers may be defined either at the beginning or end of the this 5 bit "idle period". In the diagram shown in FIG. 3, the microslots are defined as the beginning of the 5 bit idle interval. During this idle period, no information may be transmitted from the M-ES on the reverse transmission channel, therefore any activity on the channel during this period can be assumed to be representative of the noise level present in the receiver.

The method of the present invention may be implemented according to the following equation:

$$\left| \sum_{k=0}^{K_1-1} r(n_0+k) \frac{s^*(k)|^2}{(n_0 > K_2)} \stackrel{?}{>} n \sum_{k=0}^{K_2-1} |n(k)|^2. \quad (1)$$

wherein $K_1$ and $K_2$ are numbers of sample points to be used, $n_o$ is the fixed delay relative to the beginning of the microslot, "*" represents the complex conjugate operation, and n is the detection threshold. The left side of the equation is a correlation of the received signal with the known dotting sequence. In particular, s(k) is a complex envelope signal representing the known dotting sequence pattern and $r(n_o+k)$ represents the received dotting sequence of the burst. Notably, in equation (1), $\{n(k), k=0, 1, \ldots, K_2-1,$ represents the noise samples, which are independent of the signal portion of the equation $\{r(n_o+k)\}$, k=0, 1, . . . , $K_1-1$.

The samples n(k),k–0,1, . . . ,$K_2-1$, in the right hand side of equation (1) represent received signal samples at the beginning of a particular microslot in which the receiver is in detection mode, i.e., they are simply r(k),k=0,1 , . . . ,$K_2-1$. The left hand side of the equation and the right hand side of the equation process non-overlapping ($n_o > K_2$) portions of the received signal for each detection process. The symbol n(k) is used in equation (1) to emphasize the fact that the invention guarantees the signal-free (or noise only) received samples for computation in the right hand side of equation (1). Therefore it can be considered as the noise power (or energy) estimation process in the receiver for a particular detection process (microslot).

An important feature of the present invention is to provide the signal-free samples for the right hand side computation in equation (1). This is accomplished by exploiting the following CDPD protocols.

1. The forward (MDBS to M-ES) over-the-air transmitted signal carries micro-slot timing marker occurring at each 3.125 milisecond (60 bits).
2. Five (5) bit fields in the beginning of each micro-slot are used for micro-slot synchronization and busy/idle flag.
3. An M-ES transmission should be synchronized with the micro-slot, i.e., the M-ES's transmission should occur within 8-bit time interval from a particular micro-slot timing determined by the M-ES.
4. An M-ES is allowed to transmit its own reverse burst only if the micro-slot is idle (i.e., busy/idle flag is set to idle by MDBS).
5. There is a guard time at the end of each reverse burst transmission (2 mili-seconds of ramp down).

Because the M-ES needs to decode the busy/idle flag before its transmission, the micro-slot timing for the M-ES is the end of the 5-bit synchronization and busy/idle flag bit fields. Therefore during this 5 bit time interval, no reverse transmission occurs. In other words, the MDBS sees signal-free received signal samples during this 5-bit time interval when it is in detection mode, i.e., the particular micro-slot is idle. The MDBS can take advantage of this situation by properly defining its own micro-slot timing to synchronize the processes (most of the MDBS's processes should be implemented synchronously with its micro-slot timing). Instead of defining micro-slot timing consistent with M-ES (at the end of 5 sync bits), the invention defines the micro-slot timing for the MDBS at the beginning of the 5 sync bits. In this way, whenever the MDBS starts its detection process, the first 5-bits worth of received signal samples are guaranteed to be signal-free (noise only).

Also, to enhance the performance, the invention exploits the delay associated with GMSK-modulation. Since the GMSK-modulation used for CDPD systems require memory (partial response signaling), it has inherent modulation delays (at least 2 bits), i.e., a modulated signal (or over-the-air signal) corresponding to a particular bit at the input to the GMSK-modulator appears at least 2 bits later (two bit delay between the GMSK-modulator input and output). Therefore, by defining the reference point of the micro-slot timing for the MDBS as the input to the GMSK-modulator, the time interval for making noise power estimation is increased by 2 bits, which gives better performance. Because the referencing scheme allows one to take advantage of the MDBS's receiver hardware delay, the noise power measurement interval can be expanded further by this amount. With this referencing scheme, exactly the same delays can be utilized with respect to the M-ESs. This additional expansion is made possible because of the guard time at the end of each reverse transmission (item 5 above). For the present invention, 3 bits on the MDBS's delay are utilized and a 1 bit delay is assumed for the M-ES's.

Therefore, an idle period totalling about 9 bits can be fully utilized for the noise floor estimation by careful generation of the micro-slot markers, and utilizing first-in-first-out (FIFO) input procedures for the MDBS input buffer. Thus, the following strategy may be implemented.

1. Generate the micro-slot marker for the MDBS DSP just before the first bit of the busy/idle flag is sent to the GMSK-modulator for GMSK modulation and transmission. This micro-slot marker constitutes the microslot timing for the MDBS DSP's to detect and demodulate a burst. Note for the M-ES, the micro-slot timing is usually at the end of the bust/idle flag (plus decoding and air delay).

2. For each idle micro-slot, reset the MDBS DSP's FIFO (or input buffer) at the reception of the micro-slot marker. The first sample in the FIFO (or input buffer) after resetting is the beginning of the particular micro-slot.

3. During the first 9 bit interval (i.e., "idle interval"), estimate the noise floor according the equation (1).

4. Get the correlation value between the received signal and the dotting sequence with some delay as in equation (1). The delay should be selected to cover the bits of uncertainty time interval and to utilize the most reliable portion of the dotting sequence.

5. Make a detection decision according to equation (1).

Accordingly, the present invention provides significant advantage in providing a method and apparatus for reliably detecting burst information by minimizing the effects of noise levels and signal quality on the detection decision. In particular, the adaptive constant false alarm rate system of the present invention can obtain an accurate estimate of the noise floor by measuring channel power or energy during a time when no signals are present on the channel. Accordingly, any activity on the channel during this idle time is a relatively accurate indication of the channel's noise activity. This noise floor estimate is incorporated into a CFAR detection scheme to thereby minimize the effects of both the noise level and signal quality on the detection scheme. Accordingly, the method and apparatus of the present invention reduces both the burst miss probability (or rate) $P_M$ and the false-alarm probability (or rate) $P_{FA}$.

Of course, it should be understood that a wide range of changes and modifications can be made to the preferred embodiment described above. For example other delays, such as known hardware delays and signal demodulation and acquisition delays can be utilized to further extend the idle interval during which the noise level is measured/estimated. It is therefore intended that the foregoing detailed description be regarded as illustrative rather than limiting and that it be understood that it is the following claims, including all equivalents, which are intended to define the scope of this invention.

What is claimed is:

1. A method of detecting signals transmitted from a first station to a second station via a communication channel, the steps comprising:
    determining an idle interval during which no signals are transmitted from the first station to the second station via the communication channel;
    measuring activity on said communication channel during said idle interval; and
    utilizing the measured activity on said communication channel during said idle interval, along with a threshold value, to determine whether activity on said communication channel outside of said idle interval comprises one of said signals.

2. The method of claim 1 wherein:
    said step of determining whether activity on said communication channel outside of said idle interval is one of said signals comprises correlating the received signal with a known signal pattern; and
    said step of measuring activity on said communication channel during said idle interval comprises measuring energy on said communication channel.

3. The method of claim 1 wherein said step of utilizing the measured activity on said communication channel during said idle interval, along with a threshold value, to determine whether activity on said communication channel outside of said idle interval comprises one of said signals comprises multiplying said threshold value by said energy measured on said communication channel.

4. The method of claim 1 wherein:
    said first station comprises a mobile communication unit;
    said second station comprises a base station of a cellular communication system; and
    said signals comprises cellular digital packet data.

5. A method of setting a threshold for detecting a signal on a communication channel, the steps comprising:
    determining an idle interval during which no signals are being transmitted on said communication channel;
    measuring activity on said communication channel during said idle interval; and
    utilizing the measured activity on said communication channel during said idle interval, along with an initial threshold, to determine the threshold.

6. The method of claim 5 further comprising the step of utilizing said threshold to determine whether activity on said communication channel outside of said idle interval comprises one of said signals.

7. The method of claim 6, wherein:
    said step of utilizing said threshold to determine whether activity on said communication channel outside of said idle interval comprises one of said signals comprises correlating a received signal with a known signal pattern; and
    said step of measuring activity on said communication channel during said idle interval comprises measuring energy on said communication channel.

8. The method of claim 7 wherein said step of utilizing the measured activity on said communication channel during said idle interval, along with said initial threshold, to determine the threshold comprises multiplying said initial threshold value by said energy measured on said communication channel.

9. The method of claim 5 wherein said signals comprise cellular digital packet data.

10. A receiver that detects signals transmitted from a remote station via a communication channel, the receiver comprising:
    an input unit capable of receiving and detecting activity on the communication channel; and
    a processing circuit in communication with said input unit and programmed to:
        determine an idle interval during which no signals are transmitted from the remote station to the receiver via the communication channel;
        measure activity on said communication channel during said idle interval; and
        utilize the measured activity on said communication channel during said idle interval, along with a threshold value, to determine whether activity on said communication channel outside of said idle interval comprises one of said signals.

11. The receiver of claim 10 wherein said processor determining whether activity on said communication channel outside of said idle interval is one of said signals comprises correlating the received signal with a known signal pattern.

12. The receiver of claim 11 wherein said processor measuring activity on said communication channel during said idle interval comprises measuring energy on said communication channel.

13. The receiver of claim 10 wherein said processor utilizing the measured activity on said communication channel during said idle interval, along with a threshold value, to determine whether activity on said communication channel outside of said idle interval comprises one of said signals comprises multiplying said threshold value by said energy measured on said communication channel.

14. The receiver of claim 10 wherein:
   said remote station comprises a mobile communication unit;
   said receiver comprises a base station of a cellular communication system; and
   said signals comprise cellular digital packet data.

15. A receiver that detects signals received via a communication channel, the receiver comprising:
   an input unit capable of receiving signals from said communication channel;
   a processor in communication with said input unit and programmed to:
      determine an idle interval during which no signals are being transmitted on said communication channel;
      measure activity on said communication channel during said idle interval; and
      utilize the measured activity on said communication channel during said idle interval, along with an initial threshold value, to determine a scaled threshold value.

16. The receiver of claim 15 wherein said processor is further programmed to utilize said scaled threshold value to determine whether activity on said communication channel outside of said idle interval comprises one of said signals.

17. The receiver of claim 16 wherein:
   said processor utilizing said scaled threshold value to determine whether activity on said communication channel outside of said idle interval comprises one of said signals comprises correlating a received signal with a known signal pattern; and
   said processor measuring activity on said communication channel during said idle interval comprises measuring energy on said communication channel.

18. The receiver of claim 17 wherein said processor utilizing the measured activity on said communication channel during said idle interval, along with said initial threshold value, to determine a scaled threshold value comprises multiplying said initial threshold value by said energy measured on said communication channel.

19. The receiver of claim 15 wherein said signals comprise cellular digital packet data.

20. A method of detecting burst information on a communication channel, the steps comprising:
   determining an idle interval during which no burst information is transmitted via the communication channel;
   measuring activity on the communication channel during the idle interval; and
   utilizing the measured activity on the communication channel during the idle interval, along with a threshold, to determine whether activity on the communication channel outside of the idle interval includes the burst information.

21. The method of claim 20, wherein:
   said step of determining whether activity on the communication channel outside of the idle interval is the burst information including correlating the received burst information with a known pattern; and
   said step of measuring activity on the communication channel during the idle interval includes measuring energy on the communication channel.

22. The method of claim 20, wherein the method is performed by a base station of a cellular communication system; and
   the burst information includes cellular digital packet data.

23. A method of setting a threshold for detecting burst information on a communication channel, the steps comprising:
   determining an idle interval during which no burst information is being transmitted on the communication channel;
   measuring activity on the communication channel during the idle interval; and
   utilizing the measured activity on the communication channel during the idle interval, along with an initial threshold, to determine the threshold.

24. The method of claim 23, further comprising the step of:
   utilizing the threshold to determine whether activity on the communication channel outside of the idle interval includes the burst information signals.

25. The method of claim 24, wherein:
   said step of utilizing the threshold to determine whether activity on the communication channel outside of the idle interval includes the burst information includes correlating a received signal with a known signal pattern; and
   said step of measuring activity on the communication channel during the idle interval includes measuring energy on the communication channel.

26. The method of claim 25, wherein said step of utilizing the measured activity on the communication channel during the idle interval, along with the initial threshold, to determine the threshold includes multiplying the initial threshold by the energy measured on the communication channel.

27. The method of claim 23, wherein the burst information includes cellular digital packet data.

28. A method of detecting burst information on a communication channel, the steps comprising:
   determining an idle interval during which no burst information is transmitted via the communication channel;
   measuring activity on the communication channel during the idle interval; and
   utilizing the measured activity on the communication channel during the idle interval, along with a threshold, to determine whether activity on the communication channel outside of the idle interval includes the burst information.

29. The method of claim 28, wherein:
   said step of determining whether activity on the communication channel outside of the idle interval is the burst information including correlating the received burst information with a known pattern; and
   said step of measuring activity on the communication channel during the idle interval includes measuring energy on the communication channel.

30. The method of claim 28, wherein the method is performed by a base station of a cellular communication system; and
   the burst information includes cellular digital packet data.

31. A method of setting a threshold for detecting burst information on a communication channel, the steps comprising:

determining an idle interval during which no burst information is being transmitted on the communication channel;

measuring activity on the communication channel during the idle interval; and utilizing the measured activity on the communication channel during the idle interval, along with an initial threshold, to determine the threshold.

32. The method of claim 31, further comprising the step of:

utilizing the threshold value to determine whether activity on the communication channel outside of the idle interval includes the burst information signals.

33. The method of claim 32, wherein:

said step of utilizing the threshold to determine whether activity on the communication channel outside of the idle interval includes the burst information includes correlating a received signal with a known signal pattern; and said step of measuring activity on the communication channel during the idle interval includes measuring energy on the communication channel.

34. The method of claim 33, wherein said step of utilizing the measured activity on the communication channel during the idle interval, along with the initial threshold, to determine the threshold value includes multiplying the initial threshold by the energy measured on the communication channel.

* * * * *